US007174556B2

(12) United States Patent
Lambert (10) Patent No.: US 7,174,556 B2
(45) Date of Patent: Feb. 6, 2007

(54) ADMINISTRATION OF A SYSTEM

(75) Inventor: Howard S. Lambert, Southampton (GB)

(73) Assignee: International Business Machines Corporation, Armonk, NY (US)

(*) Notice: Subject to any disclaimer, the term of this patent is extended or adjusted under 35 U.S.C. 154(b) by 770 days.

(21) Appl. No.: 10/317,984

(22) Filed: Dec. 12, 2002

(65) Prior Publication Data

US 2004/0049775 A1 Mar. 11, 2004

(30) Foreign Application Priority Data

Sep. 6, 2002 (GB) ................. 0220740.5

(51) Int. Cl.
*G06F 13/00* (2006.01)
(52) U.S. Cl. ............... 719/315; 719/313; 719/314; 719/316; 718/100; 718/101
(58) Field of Classification Search ........... 718/100, 718/101; 719/314, 315, 310, 313, 316; 707/103 R, 707/103 Y, 103 X; 709/201, 217, 245
See application file for complete search history.

(56) References Cited

U.S. PATENT DOCUMENTS

| 6,341,339 B1* | 1/2002 | Kontothanassis et al. ... 711/148 |
| 6,529,932 B1* | 3/2003 | Dadiomov et al. ......... 718/101 |
| 7,000,235 B2* | 2/2006 | Mandal et al. ............. 719/315 |

2004/0015508 A1* 1/2004 Anonsen .................. 707/100

FOREIGN PATENT DOCUMENTS

GB 2378270 A 5/2003

OTHER PUBLICATIONS

IBM, MQSeries, Everyplace for Multiplatforms, Introduction Version1.1.
IBM, MQSeries, Everyplace for Multiplatforms, Programming Guide Version1.1.

* cited by examiner

*Primary Examiner*—William Thomson
*Assistant Examiner*—Andy Ho
(74) *Attorney, Agent, or Firm*—Duke W. Yee; D'Ann N. Rifai; Theodore D. Fay, III (57) ABSTRACT

A method for administration in an object-oriented data processing environment is provided, for use in a distributed messaging system comprising a local computer system, a remote computer system having a remote queue object to be administered and a network. A query object is sent to the remote queue object in order to obtain a first copy of the remote queue object. Once the first copy is received, a second copy of the remote queue object is made at the local computer system and an administrator uses this second copy to make one or more updates. The updates and the first copy are then sent to the remote queue object. The remote queue object in its current state is compared to the first copy, in order to determine whether they match. If a match occurs, the administrator's updates are processed and the remote queue object is replaced with the updated version.

19 Claims, 5 Drawing Sheets

ADMINISTRATION OF A SYSTEM

FIELD OF THE INVENTION

The present invention relates to administration of a system in an object-oriented environment.

BACKGROUND OF THE INVENTION

Many communications solutions implement a synchronous communication model—requiring a dedicated logical connection between sender and receiver for the communication to succeed. For example, Web browser HTTP requests and responses are synchronous—the requesting Web browser typically sends a request and waits for a response from a Web server before continuing with any other processing. The initial HTTP request includes a Uniform Resource Locator (URL) specifying the Web page that the administrator of the Web browser requires. An Internet administrator may initiate a conversational flow of requests and responses, such as when enquiring about and then ordering a product, and it may be necessary for one or more of the flows to be encrypted to protect the administrator's credit card details or other personal information. The conventional approach to providing such security uses Secure Sockets Layers (SSL), which provides all-or-nothing encryption across a communication link but does not provide end-to-end security between application programs.

Asynchronous communication models are also well known, such as implemented by a number of commercially available message-oriented middleware products. Middleware products support communications between application programs across a network. These include IBM Corporation's MQSeries (MQSeries is a registered trademark of International Business Machines Corporation) and WebSphere (WebSphere is a registered trademark of International Business Machines Corporation) MQ family of messaging products, which use asynchronous messaging via queues. A sender application program issues a "putMessage" command to send a message to a target queue, and MQSeries queue manager programs handle the complexities of transferring the message from the sender to the target queue, which may be remotely located across a heterogeneous computer network. The MQSeries queue manager programs implement transactional assured message delivery even when the destination application is not available at the time the message was sent. The target queue is a local input queue for another application program, which retrieves the message from its input queue by issuing a "getMessage" command asynchronously from the send operation. The receiver application program then performs its processing on the message, and may generate further messages.

IBM Corporation's MQSeries Everyplace product is an example of a messaging product which implements asynchronous communications as described above as well as a form of synchronous communication. MQSeries Everyplace provides messaging functionality to laptop computers, PDAs, phones, point-of-sale machines etc. A local MQSeries Everyplace queue manager can (1) Put a message to a local queue and then return control to the sending application (the local queue may be a proxy for a remote queue, with asynchronous message transfer between the local proxy and the remote destination queue being trusted to the queue manager programs), or (2) it can implement a putMessage operation to place the message on a remote queue and only return control when the message is confirmed to have arrived at the target queue. In both cases, a putMessage operation is followed by a subsequent getMessage operation to take the message from the target queue, and so the overall application-to-application communication is asynchronous. IBM's MQSeries Everyplace product has been developed using object-oriented (OO) programming techniques. (IBM, WebSphere, MQSeries and Everyplace are trademarks of International Business Machines Corporation).

As is well known in OO programming, objects are instances of classes, which are abstract definitions of the characteristic attributes, and functions (known as methods) of a named data type which represents a real world entity. Thus each class is an abstraction of a real world entity. An object includes attribute data and the class functions (methods), which operate on that data. The data and class functions are tightly bound together within the object, and this integration of data and class functions within an object is known as encapsulation. Another important concept of OO programming is inheritance—that is, classes can implement a hierarchy in which all descendant classes of a base class include all of its characteristic attributes and class functions, and add additional attributes or class functions.

SUMMARY OF THE INVENTION

According to a first aspect, the present invention provides a method for administration in a distributed object-oriented data processing environment, comprising: sending from a first data processing apparatus to an object to be administered associated with a second data processing apparatus, a first object for obtaining a first copy of said object to be administered; receiving by said first data processing apparatus, a second object comprising said first copy; in response to receiving said second object, obtaining a third object, in which said third object comprises a second copy of said object to be administered; applying one or more updates to said third object; sending said updated third object and said first copy to said object to be administered; obtaining a current copy of the object to be administered and determining if said current copy of the object to be administered and said first copy object to be administered match; and in response to a successful determining step, replacing said object to be administered with said updated third object.

Advantageously the administration process is simplified in that the administrator at the first data processing apparatus need not waste time by sending explicit queries in order to determine the structure, data and characteristics of the object to be administered (e.g. a remote queue, an application program etc). Rather, in response to a query message object (i.e. the first object), a copy of the entire object to be administered is sent to the administrator in a reply message object (i.e. the first copy is embedded in the second object—this embedding is preferably carried out by one or more functions associated with the first object). The administrator now has all the information associated with the object to be administered to hand.

The first data processing apparatus comprises means for obtaining a third object, which comprises a second copy of the object to be administered. The third object is stored locally on the first data processing apparatus and advantageously the administrator can make as few or as many updates and/or changes to this third object. Therefore, the number of messages that need to be exchanged for administration is greatly reduced especially in cases where multiple updates are required.

Preferably, the updated third object comprises one or more functions, which when executed, obtain a current copy of the object to be administered (e.g. a copy of the remote queue object in its current state); determine whether this current copy and the first copy match and replace the object to be administered in its current state with the updated third object if a match occurs. Since replacement only occurs if the current copy matches the first copy, this means that the object to be administered must not have been altered since the first copy was sent to the administrator. Therefore, an advantage is that only successful changes or updates are carried out and this means that "rolling back" unsuccessful operations is not required. Yet another advantage is that locking is not required and therefore, multiple administrators can use locally stored copies of the target object to be administered and can update simultaneously. The outcome of the step of determining whether the current copy and the first copy match will determine which of the updates are successful.

In a preferred embodiment, in response to an unsuccessful determining step, the object to be administered sends error data to the first data processing apparatus, to facilitate diagnostics. A current copy of the object to be administered can also be sent, so that the administrator can try the updating process once more. Preferably, the administrator has access to an administration application associated with the first data processing apparatus, in order to view and manipulate information.

According to a second aspect, the present invention provides an apparatus for administration in an object-oriented environment, for use in a distributed system comprising a network, a first data processing apparatus and a second data processing apparatus comprising an object to be administered, the apparatus further comprising: means for sending by said first data processing apparatus via said network to said object to be administered, a first object for obtaining a first copy of said object to be administered; means for receiving by said first data processing apparatus, a second object comprising said first copy; means, responsive to said means for receiving, for obtaining by said first data processing apparatus, a third object comprising a second copy of said object to be administered; means for applying, by said first data processing apparatus, one or more updates to said third object; means for sending by said first data processing apparatus, said updated third object and said first copy to said object to be administered; means for obtaining a current copy of said object to be administered and means for determining if said current copy of said object to be administered and said first copy object to be administered match; and means, responsive to a successful determination, for replacing said object to be administered with said updated third object.

According to a third aspect, the present invention provides a computer program comprising program code means adapted to perform the method as described above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE INVENTION

The present invention is implementable in association with IBM Corporation's MQSeries Everyplace messaging product. This computer program product extends IBM's MQSeries family of messaging products to meet the requirements of lightweight devices such as laptops, PDAs and sensors, and supports mobility and the requirements that arise from the use of fragile mobile communication networks. It provides assured once-only delivery of messages in the mobile environment, and is described in more detail in IBM Corporation's orderable documents numbers GC34-5843-01 "MQSeries Everyplace for Multiplatforms Introduction, version1.1" and SC34-5845-01 "MQSeries Everyplace for Multiplatforms Programming Guide, version 1.1".

Figure 1:
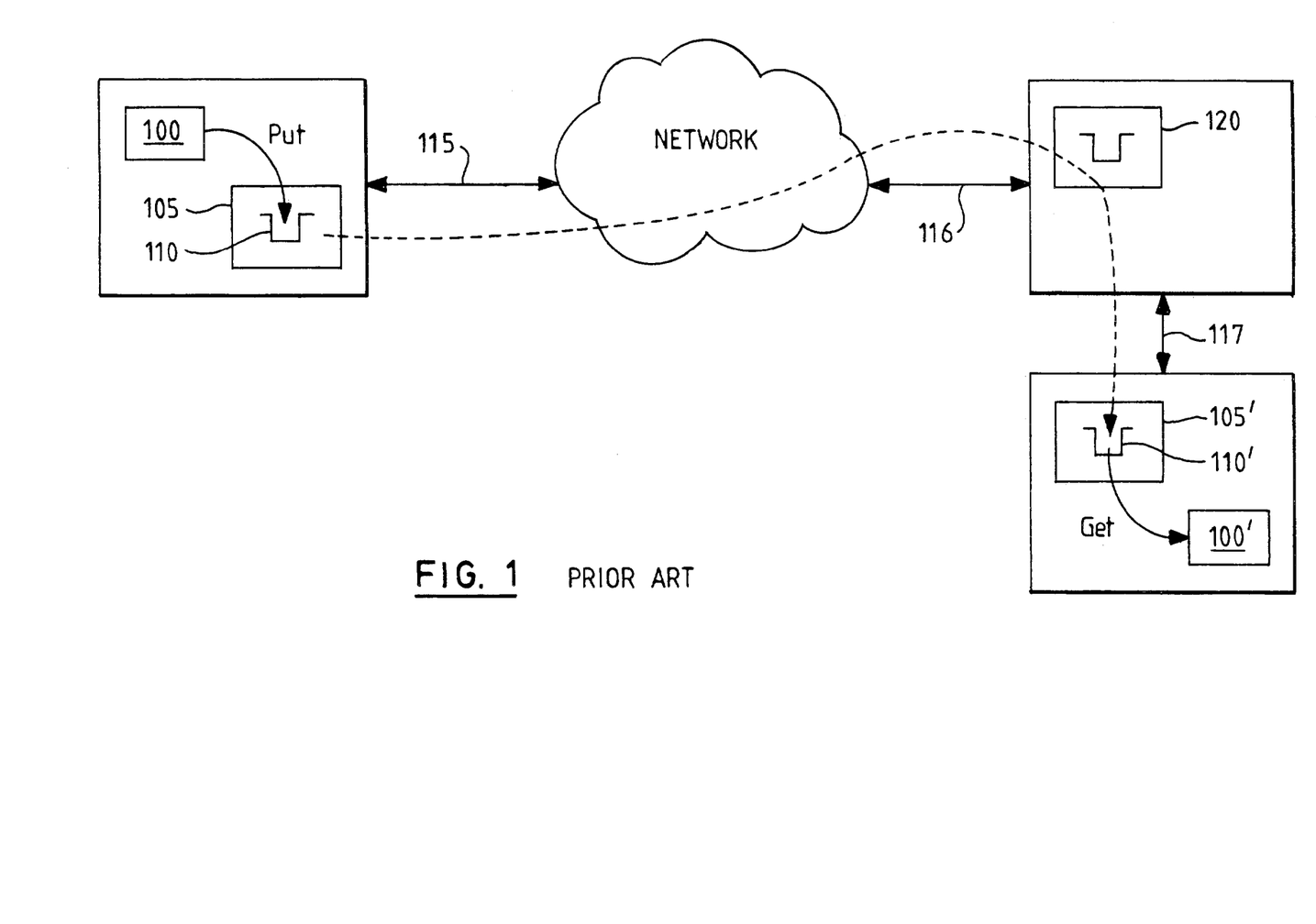
FIG. 1 is a schematic representation of messaging across a network, as is known in the art.

The messaging mechanisms of IBM's MQSeries products include communication managers (the message queue managers), which manage queues and the storing and transfer of messages between queues. An example of a prior art distributed environment for messaging is shown in FIG. 1. Applications (100), (100') communicate with each other using the facilities of a local queue manager (105), sending messages to queues (110) (by issuing a putMessage command) and retrieving incoming messages from queues (110') (using a getMessage command). If a message is put to a remote queue (110'), i.e. one owned by a remote queue manager (105'), then it is transmitted over channels (115, 116, 117) to that remote queue manager. In this way, messages can be passed through intermediate queue managers (120) before reaching their destination. The operations of sending a message by one application and receiving a message by another application can be asynchronous, with the messages being queued en route when required.

Significant elements of the MQSeries Everyplace programming model are messages, queues and queue managers. The messages are objects that can contain application-defined content. They are typically held in a queue as a staging point during transmission between applications and they may be moved across a network of MQSeries Everyplace queue managers. Messages are addressed to a target queue by specifying the target queue manager and queue name pair.

MQSeries Everyplace messages are message objects (MQeMsgObject), inherited from an MQSeries Everyplace object known as the fields object. These messages have no concept of a header or a message body but they do have properties and methods. MQeMsgObject objects are an accumulation of fields for holding data items for sending and receiving or manipulating messages, with each field comprising a name, a data type and the data values. Each name is unique within the MQeMsgobject object, is at least 1 character long (but kept short to minimize size for transmission) and conforms to the ASCII character set. The name is used to retrieve and update values. An MQeMsgObject object is constructed as follows:

MQeMsgObject Msg=new MQeMsgObject( )

Message objects support various method calls, for example: enumeration of fields, copy a constituent field or fields (with a replace option), compare fields objects, put and get to/from constituent fields, inspect fields objects (e.g. is a constituent field contained within the object), dump and restore to/from a byte array etc.

Message objects include a UID (unique identifier) that is generated by MQSeries Everyplace. This UID uniquely identifies each individual message object in the entire MQSeries Everyplace network and is constructed from the name of the originating queue manager and the time that the message object was created. No other information is required to be present in a message destined for another MQSeries Everyplace queue manager, though other fields will almost certainly be present.

Queues are typically used to hold message objects pending their removal by application programs. Like messages, queues also derive from the fields objects. Direct access by applications to the queue object is not normally permitted—however direct access is permitted inside a queue rule. Instead the queue manager acts as an intermediary between application programs and queues. Queues are identified by name and the name can be an ASCII character string of unlimited length.

Administrative functions control access to the message queuing environment. Queue manager and queue-level functions are controlled by administration, as is certification. Message-related functions are typically regarded as the responsibility of applications. Administration is provided through an administrative interface that handles the generation and receipt of administration messages and is designed such that local and remote administration are handled in an identical manner.

By default, any MQSeries Everyplace application can administer managed resources. The application can be running as a local application to the queue manager that is being managed, or it can be running on a different queue manager. It is important that the administration actions are secure, otherwise there is potential for the system to be misused. MQSeries Everyplace provides the basic facilities for securing administration using queue-based security. Queue-based security automatically protects MQSeries Everyplace message data between the initiating queue manager and queue, on the queue, and between the queue and the receiving queue manager. This protection is independent of whether a local or a remote queue manager owns the target queue.

If synchronous security is used, the administration queue can be secured by setting security characteristics on the queue. For example an authenticator can be set so that the administrator must be authenticated to the operating system (Windows NT (Microsoft, Windows, Windows NT, and the Windows logo are trademarks of Microsoft Corporation in the United States, other countries, or both) or UNIX (UNIX is a registered trademark of the Open Group in the United States and other countries)) before they can perform administration actions. This can be extended so that only a specific administrator can perform administration. The administration queue does not allow applications to directly access messages on a queue. Rather, the messages are processed internally.

Figure 2:
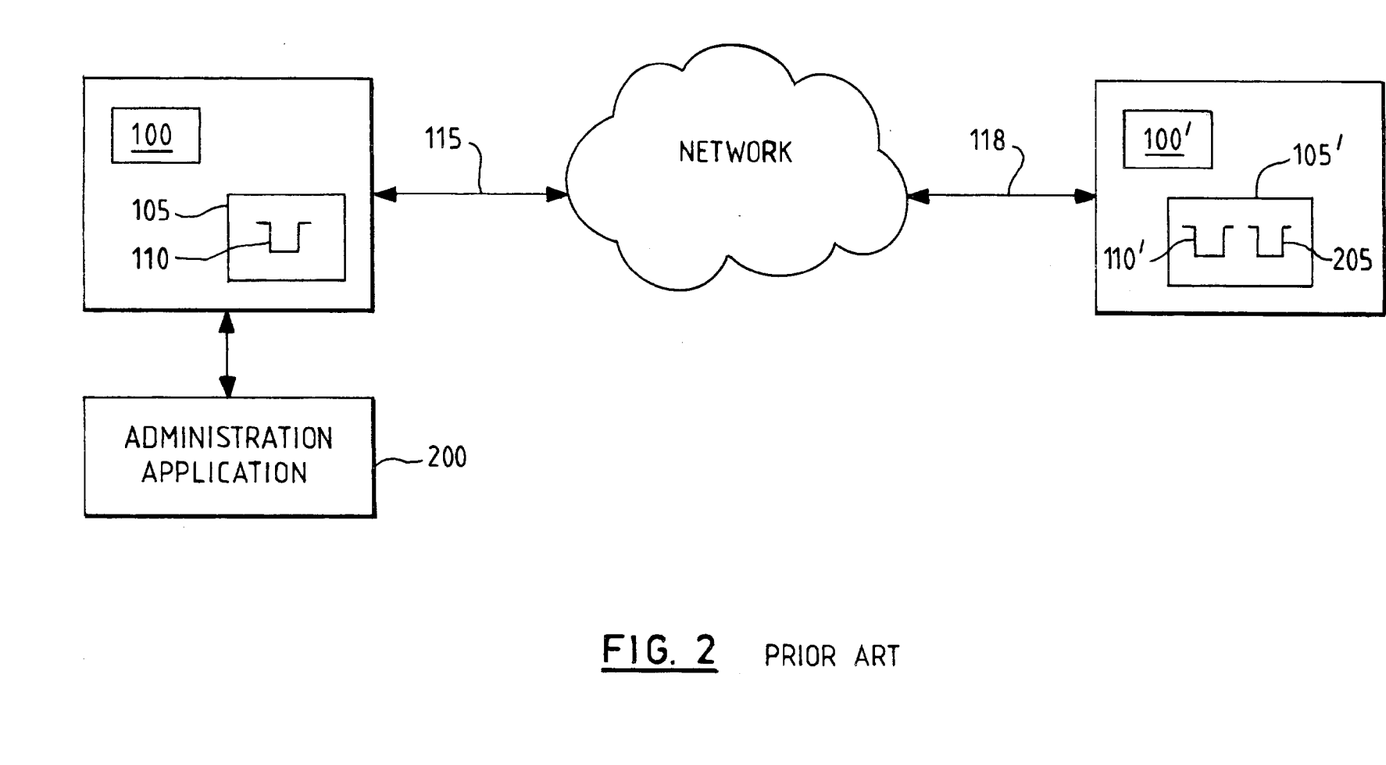
FIG. 2 is a schematic representation of administrative messaging across a network, as is known in the art.
Figure 3:
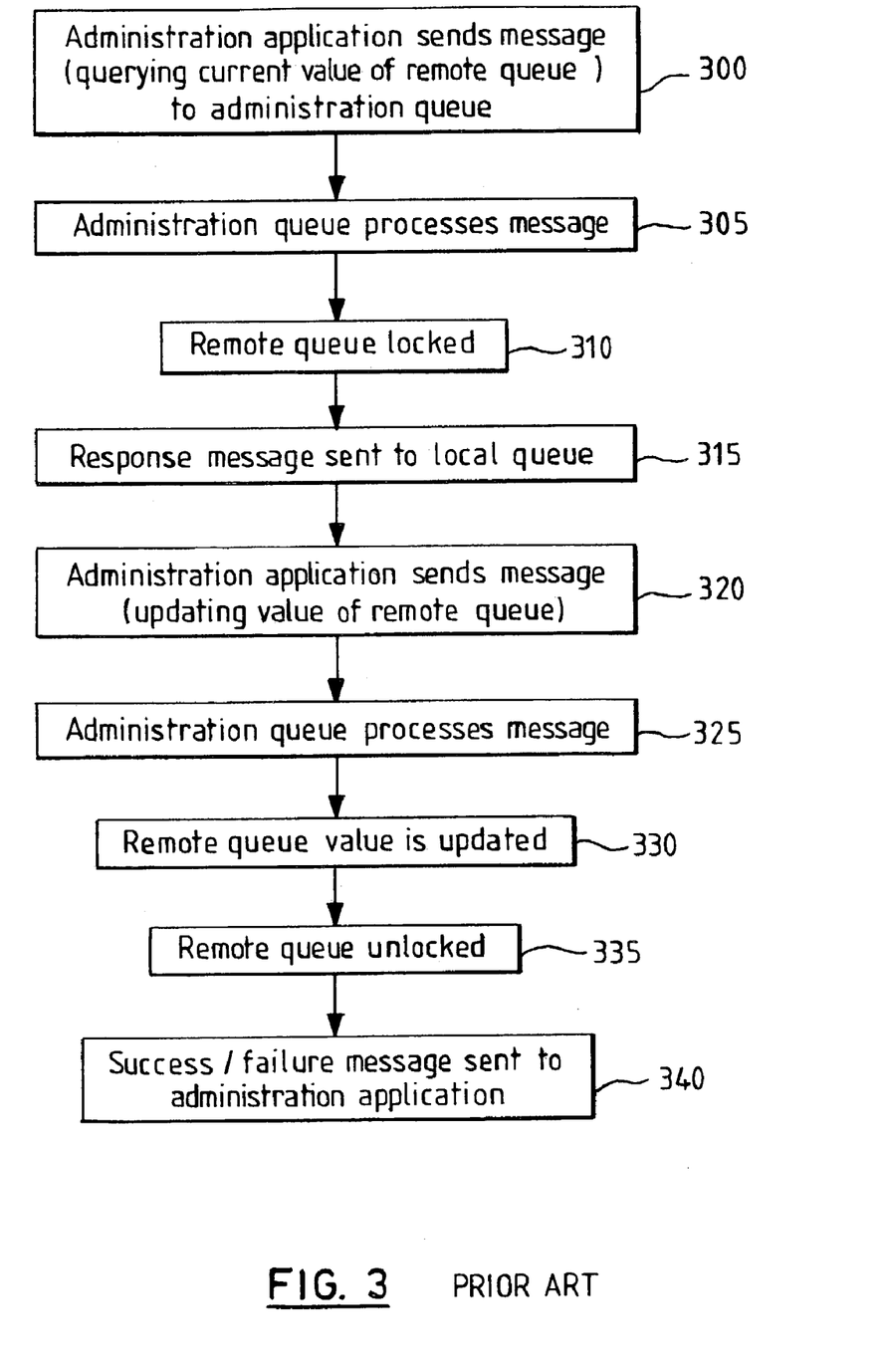
FIG. 3 is a flow chart showing the operational steps involved in the administrative messaging system of FIG. 2.

One embodiment of a prior art method of administration in a messaging system will now be described with reference to FIG. 2 and FIG. 3. It should be noted that the messaging system is in a distributed environment. Referring to FIG. 2, applications (100) and (100') communicate with each other utilizing channels (115, 118). The applications (100) and (100') have associated queue managers (105 and 105' respectively), whereby the queue managers have associated queues (110 and 110' respectively). The local application (100) has an associated administration application (200) that is accessed via a graphical administrator interface (GUI) and is used for various functions e.g. administering a remote queue (110').

The remote queue manager (105') has an associated administration queue (205). Administration queues are the mechanism through which queue managers (and their associated objects) are configured, either locally or remotely. A message sent to the administration queue is processed by the relevant administration message class and then, optionally, a reply is sent back to the originating application. The administration queue itself is unusual in that it does not have a persistent store—all messages are processed on arrival. Only one such administration queue exists per queue manager and access is subject to any authenticator that may have been associated with the queue. The security attributes of the administration queue are used to control access to administrative function, the level of cryptor chosen defining the level of confidentiality required.

One example of prior art administration invoked by a administrator at an application (100) will now be described in more detail with reference to FIG. 3. Firstly, a query administration message object (a descendent message object) is sent (step 300) by the administration application (200). The message is targeted to the administration queue (205) associated with the remote queue manager (105'). In this example, the function of the message is to query the remote queue (110') in order to determine its current value. It should be understood that this querying step needs to be carried out in prior art systems, because the administrator at the application (100) does not know the structure of the remote queue object in advance.

When the administration queue (205) receives the message, it is processed (step 305) immediately because the administration queue (205) does not have a persistent store. The remote queue (110') is locked (step 310) to prevent the value (or state) of the remote queue (110') from changing.

The results to the query administration message object created in step 300 are sent (step 315) in a reply message to the queue (110) of the local application (100). In this example, the result to the query is "Remote queue value=1000 messages". The administrator at the application (100) views the results via the GUI associated with the administration application (200) and can decide whether or not to update the remote queue (110'). In this case, the administrator decides to proceed with an update and sends (step 320), via the associated administration application (200), an update administration message object (a descendent message object) to the administration queue (205). In this example, the update message specifies the following: "Update the remote queue value to 2000 messages".

When the administration queue (205) receives the message, it is processed (step 325) immediately. The value of the remote queue (110') is updated (step 330) and therefore, the maximum limit of the remote queue (110') is now 2000 messages. The remote queue (110') is then unlocked (step 335). Finally, a success (or failure) reply message is returned to the local queue (110) via the administration application (200). The administrator is informed that the value of the remote queue (110') is now 2000 messages.

There are a number of problems with some prior art messaging systems. One problem is that during message exchange (between steps 310 and 335) between a local application and an object to be administered (e.g. a remote queue held on another application), the latter needs to be locked and this has a number of consequences. For example, further applications are prevented from accessing the object to be administered whilst the local application is exchanging messages with it. Furthermore, if the channel utilized by the local application and the object to be administered "breaks" during message exchange, the locks that have been applied to the object to be administered will remain until an administrator has "cleaned them up". Therefore, the object to be administered will be unavailable to any other applications until the locks have been cleaned up. In a remote environment, locking can be disadvantageous in that the process is serialized.

Another problem in a distributed environment, is that if administrator at the application (100) wishes to make multiple concurrent updates, network traffic is increased. For each update, two pairs of messages are exchanged:

1. The query administration message object (sent at step 300) from the local application and the reply administration message object (sent at step 315) from the administration queue associated with the target object to be administered.
2. The update administration message object (sent at step 320) from the local application and the success/failure message object (sent at step 340) from the target object to be administered.

This represents a double-exchange across the network and therefore, for multiple updates, the number of messages being exchanged dramatically increases. One solution to the increased network traffic problem is to use "batch processing", whereby the multiple update messages are "batched" and then sent over the network in one or more transactions. However, although this reduces the network traffic, the actual number of messages is not reduced.

Yet another problem is that if one or more of the multiple update messages fail, none of the updates will be processed. Specifically, only the last update administration message object can be "un-done" or "rolled back". Consequently, the target queue can be left in an incorrect state.

Figure 4:
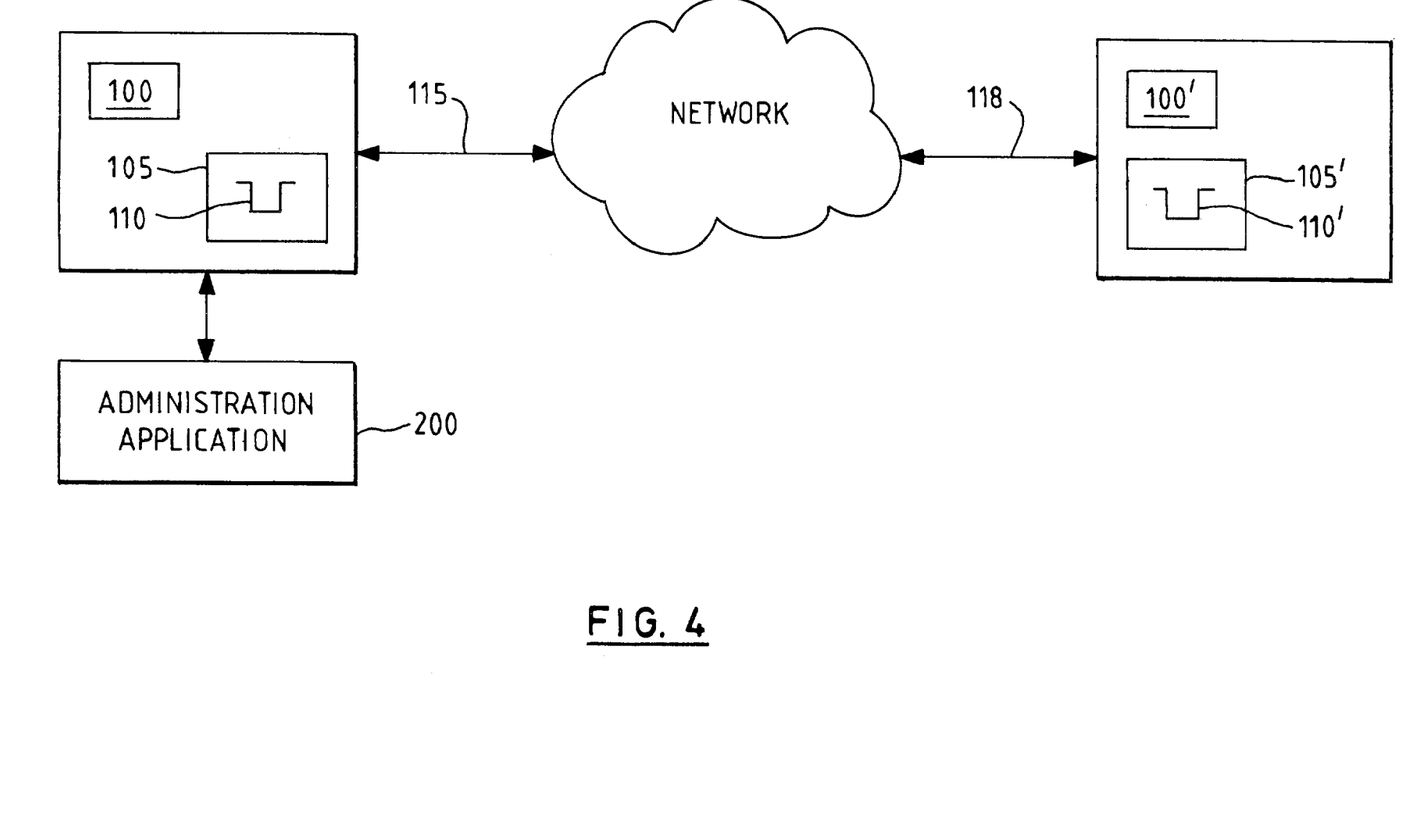
FIG. 4 is a schematic representation of administrative messaging across a network.

The preferred embodiment of the present invention will now be described. Referring to FIG. 4, there is shown a distributed environment, in which applications (100) and (100') communicate with each other utilizing channels (115, 118). As shown before in FIG. 2, the applications (100) and (100') have associated queue managers (105 and 105' respectively), whereby the queue managers have associated queues (110 and 110' respectively). The local application (100) has an associated administration application (200) that is accessed via a graphical administrator interface (GUI). It should be understood, that by utilizing the present invention, the remote application (100') does not need an associated administration queue.

Figure 5:
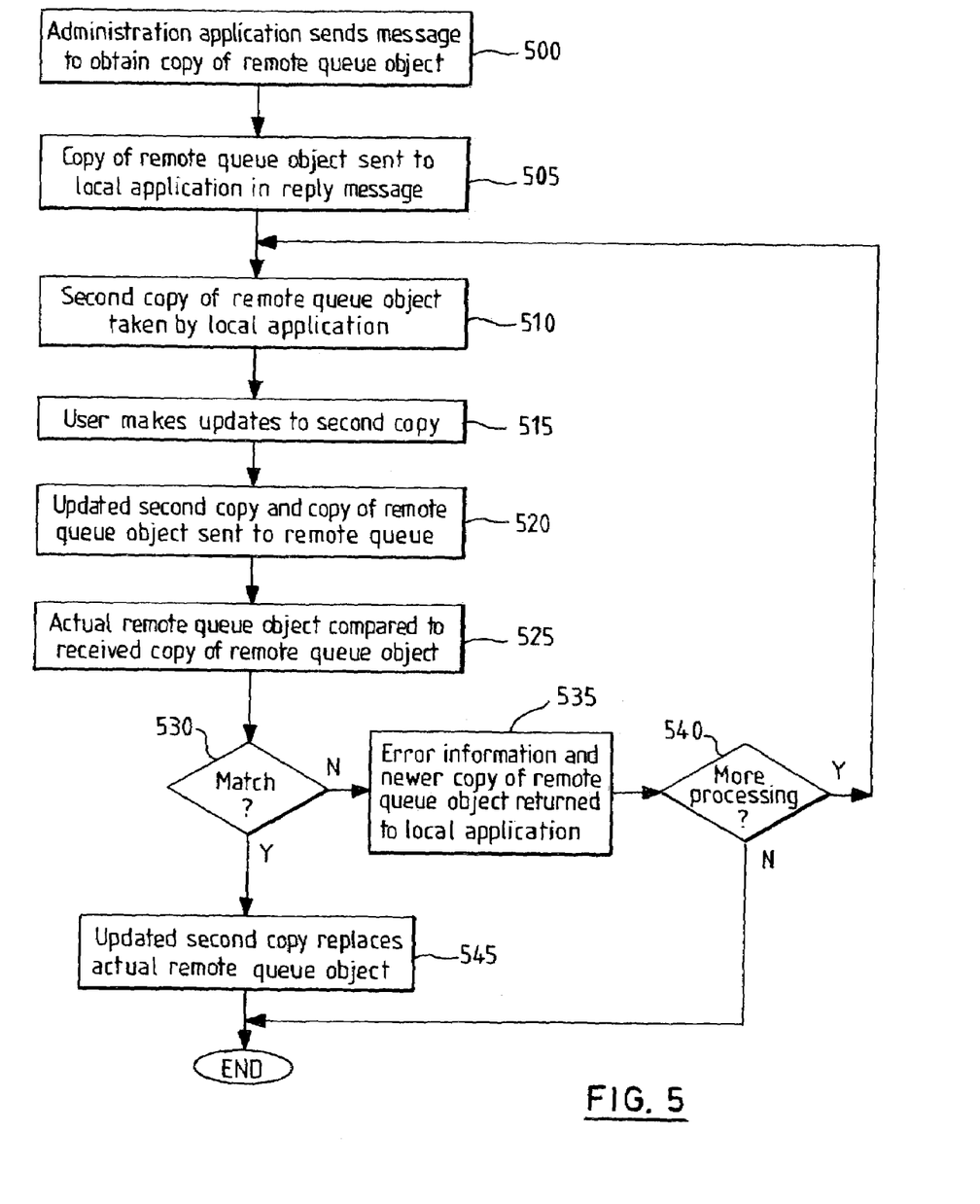
FIG. 5 is a flow chart showing the operational steps involved in the administrative messaging system of FIG. 4.

One example of administration according to the present invention invoked by an administrator at an application (100) will now be described in more detail with reference to FIG. 5. Firstly, a query administration message object (a descendent message object) is sent (step 500) by the administration application (200). The query administration message object is targeted to the remote queue (110') on the remote queue manager (105') and has additional functions to automatically obtain a copy of the object to be administered. In this example, the function of the message is to obtain a copy of the remote queue object.

Preferably, the query administration message object also has additional functions to automatically embed the copy of the remote queue object in a reply message object. Thus, once a copy of the remote queue object is taken, the copy is sent (step 505) to the queue (110) of the local application (100) in a reply message via the administration application (200). The copy of the remote queue object comprises all the data associated with the remote queue (110'). The administrator at the application (100) views the results via the GUI associated with the administration application (200). In this example, the administrator views a sub-set of the data associated with the remote queue (110'), namely: "Remote queue value=3000 messages"; "Default priority for messages=5" (whereby 0=minimum, 9=maximum); "Message expiry time=500 ms".

The local application (100) makes (step 510) another copy of the remote queue object. The application (110) now has access to all of the data associated with the remote queue object (e.g. queue characteristics such as the default priority for messages). The administrator can make as many or as few updates/changes to the second copy of the remote object. In this example, the administrator makes (step 515) multiple updates locally, namely: "Update the remote queue value to 2000 messages"; "Update the default priority to 7"; "Update the message expiry time to 700 ms".

In order to make the above multiple concurrent updates in the prior art system, six pairs of messages would need to be exchanged and the network traffic is therefore increased. However, an advantage of the present invention is that all three updates can be made locally on the second stored copy of the remote queue object without requiring message exchange.

When the administrator has finished updating the second copy, this updated second copy (i.e. an update administration message object that is a descendant message object) together with the copy of the remote queue object (which was received in step 505) is sent (step 520) to the remote queue (110').

When the objects are received at the remote queue (110'), the update administration message object has additionally functions to automatically obtain a copy of the existing object to be administered (in this case, a copy of the actual remote queue object). The copy of the actual remote queue object is automatically compared (step 525) to the copy of the remote queue object (which was received in step 505). The comparison determines whether the actual remote queue object matches (step 530) the copy of the remote queue object.

If a match does not occur (negative result to step 530), this means that the actual remote queue object is different from the copy of the remote queue object and therefore, the configuration of the actual remote queue object has changed since the copy of the remote queue object was sent in step 505, for example, by another local application changing the value of the remote queue (110') to 1500 messages. In this case, the updates are not processed and preferably, the remote queue (110') sends (step 535) error information (whereby the administrator is informed that the value of the remote queue has been changed) and a copy of the actual remote queue object to the local application (100). If the administrator wishes to carry on with administration tasks (positive result to step 540) the process returns to step 510. However, if the administrator wishes to finish administration (negative result to step 540) the process ends.

Referring back to step 530, if a match does occur (positive result to step 530), the actual remote queue (110') is in the same state as when a copy of the remote queue object was sent (in step 505) to the local application (100). In this case, the administrator's updates are processed and the update administration message object has additional functions, which when executed, automatically replace (step 545) the actual remote queue object with the second copy of the remote queue object. Therefore, an administrator's updates and/or changes are only processed if the comparison step succeeds.

It should be understood that although the preferred embodiment has been described within a networked client-server environment, the present invention could be implemented in any environment. For example, the present invention could be implemented in a stand-alone environment, whereby local administration occurs.

The invention claimed is:

1. A computer-implemented method for administration in a distributed object-oriented data processing environment, comprising:
   sending from a first data processing apparatus to an object to be administered associated with a second data processing apparatus, a first object for obtaining a first copy of said object to be administered, wherein the object to be administered is a queue object;
   receiving by said first data processing apparatus, a second object comprising said first copy;
   in response to receiving said second object, obtaining a third object, in which said third object comprises a second copy of said object to be administered;
   applying one or more updates to said third object;
   sending said updated third object and said first copy to said object to be administered;
   obtaining a current copy of the object to be administered and determining if said current copy of the object to be administered and said first copy object to be administered match; and
   in response to a successful determining step, replacing said object to be administered with said updated third object.

2. A method as claimed in claim 1, in which said first object comprises one or more functions to execute said obtaining a first copy step.

3. A method as claimed in claim 1, in which said first object comprises one or more functions for embedding said first copy in said second object.

4. A method as claimed in claim 1, in which said steps of obtaining a copy of the current object; determining and replacing, are executed by one or more functions associated with said updated third object.

5. A method as claimed in claim 1, further comprising the step of: in response to an unsuccessful determining step, sending, to said first data processing apparatus, by said object to be administered, error data.

6. A method as claimed in claim 1, in which said first object is a query administration message object.

7. A method as claimed in claim 1, in which said second object is a reply administration message object.

8. A method as claimed in claim 1, in which said third object is stored in storage associated with said first data processing apparatus.

9. A method as claimed in claim 1 in which said first data processing apparatus has an associated administration application.

10. An apparatus for administration in an object-oriented environment, for use in a distributed system comprising a network, a first data processing apparatus and a second data processing apparatus comprising an object to be administered, the apparatus further comprising:
    means for sending by said first data processing apparatus via said network to said object to be administered, a first object for obtaining a first copy of said object to administered, wherein the object to be administered is a queue object;
    means for receiving by said first data processing apparatus, a second object comprising said first copy;
    means, responsive to said means for receiving, for obtaining by said first data processing apparatus, a third object comprising a second copy of said object to be administered;
    means for applying, by said first data processing apparatus, one or more updates to said third object;
    means for sending by said first data processing apparatus, said updated third object and said first copy to said object to be administered;
    means for obtaining a current copy of said object to be administered and means for determining if said current copy of said object to be administered and said first copy object to be administered match; and
    means, responsive to a successful determination, for replacing said object to be administered with said updated third object.

11. An apparatus as claimed in claim 10, in which said first object comprises one or more functions to execute said obtaining a first copy step.

12. An apparatus as claimed in claim 10, in which said first object comprises one or more functions for embedding said first copy in said second object.

13. An apparatus as claimed in claim 10, in which said means for obtaining a copy of the current object;
    determining and replacing, are executed by one or more functions associated with said updated third object.

14. An apparatus as claimed in claim 10, further comprising means, responsive to unsuccessful determining means, for sending, to said first data processing apparatus, by said object to be administered, error data.

15. An apparatus as claimed in claim 10, in which said first object is a query administration message object.

16. An apparatus as claimed in claim 10, in which said second object is a reply administration message object.

17. An apparatus as claimed in claim 10, in which said third object is stored in storage associated with said first data processing apparatus.

18. An apparatus as claimed in claim 10, in which said first data processing apparatus has an associated administration application.

19. A computer program product stored in a computer readable medium, said computer program product comprising program code means adapted to perform the method of claim 1 when said program code means is run on a computer.

* * * * *